United States Patent [19]

Asano et al.

[11] 4,086,815

[45] May 2, 1978

[54] DEVICE FOR USE IN SENSING PRESSURES

[75] Inventors: Isamu Asano; Mitsuru Tamai; Tadanori Yuhara; Takeshi Yasuhara, all of Kawasaki, Japan

[73] Assignee: Fuji Electric Co., Ltd., Kawasaki, Japan

[21] Appl. No.: 708,251

[22] Filed: Jul. 23, 1976

[30] Foreign Application Priority Data

Jul. 24, 1975 Japan .................................. 50-90523
Oct. 29, 1975 Japan .................................. 50-130041

[51] Int. Cl.² .............................................. G01L 9/12
[52] U.S. Cl. ...................................................... 73/721
[58] Field of Search ............... 73/407 R, 398 C, 406; 317/246; 73/398 AR, 398 R; 338/4, 42; 336/30

[56] References Cited

U.S. PATENT DOCUMENTS

| | | | |
|---|---|---|---|
| 3,195,028 | 7/1965 | Werner et al. | 73/398 C |
| 3,559,488 | 2/1971 | Weaver | 73/407 R |
| 3,618,390 | 11/1971 | Frick | 73/398 C |

Primary Examiner—Donald O. Woodiel

Attorney, Agent, or Firm—Sughrue, Rothwell, Mion, Zinn and Macpeak

[57] ABSTRACT

A pressure sensing device is disclosed having the pressure sensing diaphragm positioned in a housing which is not stressed or enlarged by large static pressure. The housing is attached within a recess of a larger casing by means of a support diaphragm. The recesses are communicated with the interior of the housing by passages therethrough to equalize the pressure inside and outside the housing. The outer side of each casing forms a pressure reception chamber with a respective pressure receiving diaphragm. The latter chambers communicate with the recess via passages in the casing. The space between the pressure sensitive diaphragm and each pressure receiving diaphragm, including the housing interior chamber, the housing passage, the casing recess, the casing passage and the pressure receptive chamber, is filled with a fluid. The construction and filling is such that overpressure on one pressure receiving diaphram causes the entire housing to move toward the inner wall of the casing. However the latter diaphragm closes with the outer wall of the casing before the housing contacts the casing inner wall.

11 Claims, 8 Drawing Figures

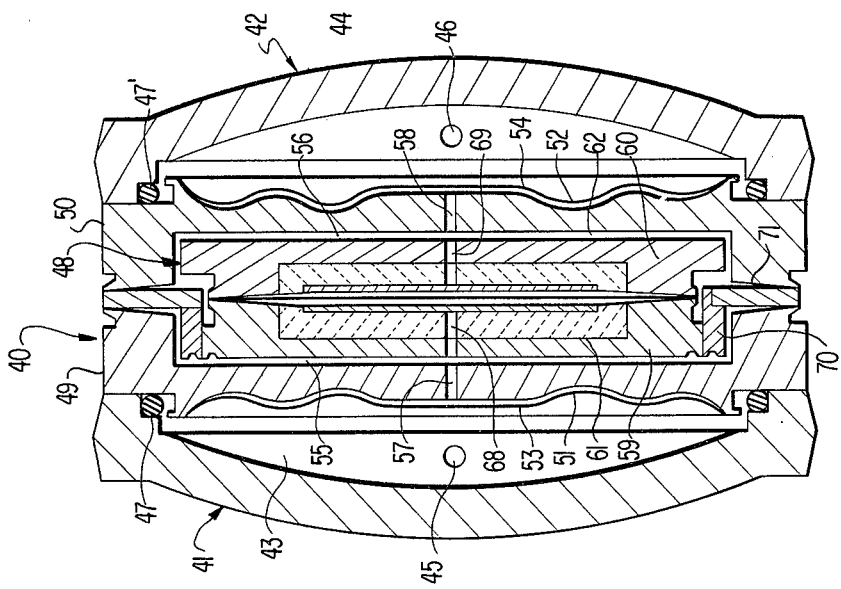
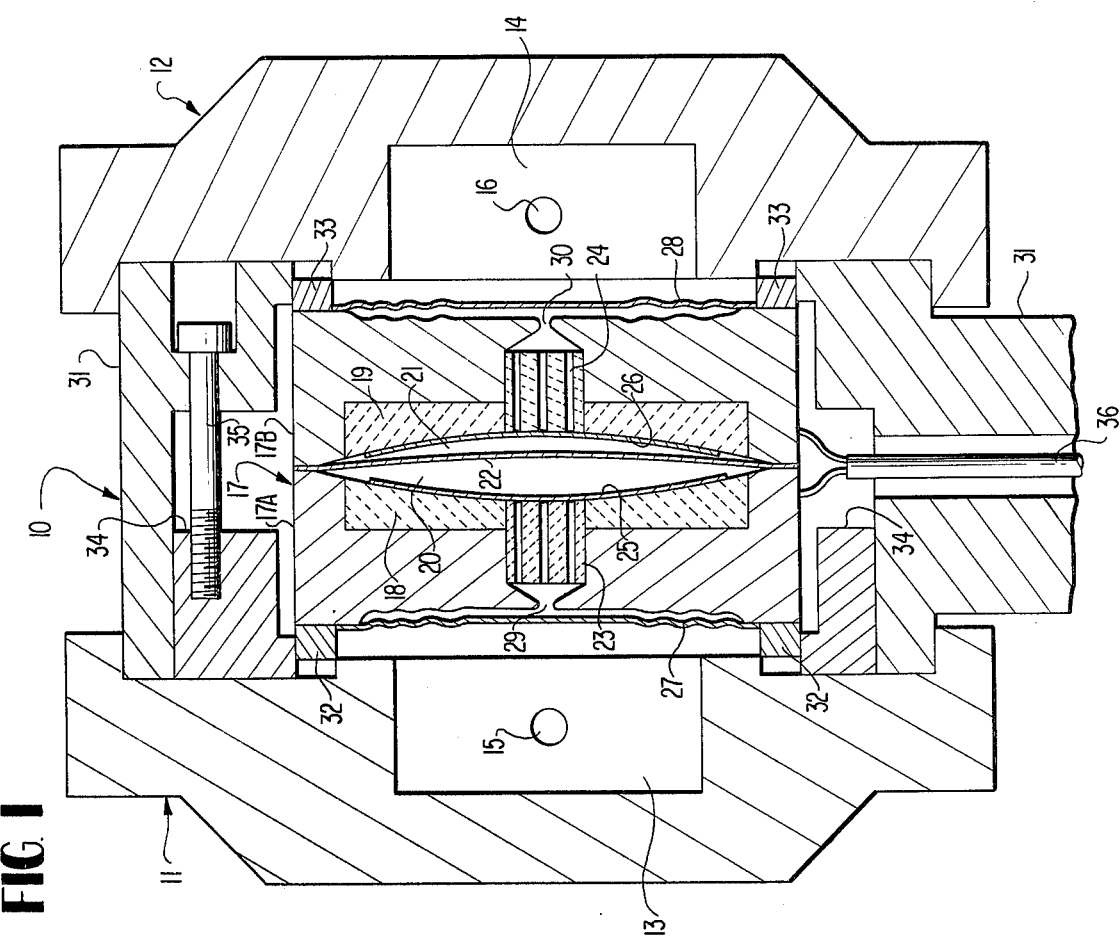

DEVICE FOR USE IN SENSING PRESSURES

BACKGROUND OF THE INVENTION

The present invention relates to a device for use in sensing pressure of a source of fluid or differential pressure between two sources of fluid.

The known devices for sensing pressures provide an arrangement such that two insulators are arranged opposite one another, with a sensing diaphragm therebetween, and metal foils are attached to surfaces of the insulators. The surfaces are directed towards the sensing diaphragm to detect changes in the electrical capacitance between the sensing diaphragm and the metal foils produced when different pressures are exerted on the opposite sides of the sensing diaphragm.

FIG. 1 shows a known pressure sensing device of the type generally described above, including an overpressure protection function. The device is described in detail in Frick U.S. Pat. No. 3,618,390, issued Nov. 9, 1971 corresponding to Japanese Patent Publication No. 23916/1974. The device essentially comprises a pressure sensing portion 10, a first cover portion 11, and a second cover portion 12. The first cover portion 11 and second cover portion 12 are secured to the pressure sensing portion 10 by means of screws or the like not shown. The first cover portion 11 is provided with a first pressure chamber 13, into which a fluid at pressure $P_1$ is introduced through a first pressure introducing port 15. Also, the second cover portion 12 is provided with a second pressure chamber 14, into which a fluid at pressure $P_2$ is introduced through a second pressure introducing port 16. A differential pressure between the pressures $P_1$ and $P_2$ is sensed by the pressure sensing portion 10.

This pressure sensing portion 10 essentially comprises a metal housing 17, a ring 31, and a stop ring 34. The metal housing 17 consists of metal portions 17A and 17B each formed with a cavity, which is filled with an insulating material 18, 19 such as glass or ceramics. The insulating materials 18 and 19 have their facing surfaces ground into dish shaped surfaces, to which metal foil 25, 26 are applied respectively. A sensing diaphragm 22 is arranged between the metal portions 17A and 17B, such that the sensing diaphragm 22 and the insulating material 18 form a first sensing chamber 20, and the sensing diaphragm 22 and the partially spherical surface of the insulating material 19 form a second sensing chamber 21. The sensing diaphragm 22 has its peripheral end portion welded to the metal portions 17A and 17B. The sensing diaphragm 22 is made of metal, and when the sensing diaphragm 22 is one capacitor plate, the metal foils 25 and 26 are other capacitor plates. Further, the metal portion 17A is provided with a first pressure receiving or isolation diaphragm 27, and the pressure $P_1$ introduced into the first pressure chamber 13 acts on diaphragm 27. The metal portion 17A and the first pressure receiving diaphragm 27 form a first pressure receiving chamber 29, which communicates with the first sensing chamber 20 via openings within a ceramic tube 23. Likewise, the metal portion 17B is provided with a second pressure receiving or isolation diaphragm 28, and the pressure $P_2$ introduced into the second pressure chamber 14 acts on the second pressure receiving diaphragm 28. The metal portion 17B and the second pressure receiving diaphragm 28 form a second pressure receiving chamber 30, which communicates with the second sensing chamber 21 via openings within a ceramic tube 24. The first sensing chamber 20 and first pressure receiving chamber 29, and the second sensing chamber 21 and second pressure receiving chamber 30 are filled with non-compressive filler liquid such as silicone oil or the like, the ceramic tubes 23 and 24 serving as a liquid flow passage for the filler liquid.

The metal member 17A has an annular ring 32 fastened thereto so as to surround the first pressure receiving diaphragm 27, whereas the metal member 17b has an annular ring 33 fastened thereto so as to surround the second pressure receiving diaphragm 28. The annular ring 33 is welded to a large ring 31 which receives housing 17. A stop ring 34, which encircles the housing 17 and is fitted in the cavity in the ring 31, is retained in position by means of screws 35 which extend through holes formed in a shoulder of the ring 31.

Thus, the pressure $P_1$ introduced into the first pressure chamber 13 acts on the first pressure receiving diaphragm 27, and the pressure $P_2$ introduced into the second pressure chamber 14 acts on the second pressure receiving diaphragm 28 to deflect the sensing diaphragm 22 in response to the difference between the pressures $P_1$ and $P_2$, whereby deflection of the sensing diaphragm 22 will cause changes in electrical capacity between the metal foils 25 and 26 as the capacitor plates. The changes in electrical capacity may be taken out through lead wires which connect to metal foils 25 and 26 through housing 17 and insulators 18, 19 and which pass through conduit 36 to thereby sense differential pressure between pressures $P_1$ and $P_2$.

In the pressure sensing device as constructed above, volumes of the first and second pressure receiving chambers are selected so that the sensing diaphragm 22 will bottom against the metal foils 25 or 26 in response to overpressure at diaphragms 27 or 28 before either of the latter will bottom against the respective metal members 17A or 17B. This insures that the overpressure stop will be positive, and because the deposited capacitor plates 25, 26 are very stable due to the massive amount of glass fused onto the housing 17, there is no shift in calibration.

The prior art devices, however, do exhibit certain drawbacks.

Firstly, there are changes in the span of sensing differential pressures due to static pressure. That is, the outer peripheral surface of the housing 17 is at atmospheric pressure, whereas the interior of the housing 17 is under very large static pressure (for example, 100 kg/cm²). This large static force tends to inflate the housing such that the interior sensing chambers becomes somewhat enlarged. The proportion, at which the interior of the housing 17 becomes larger, depends upon the magnitude of high static pressure acting on the first sensing chamber 20 and second sensing chamber 21. This enlargement of the housing 17 means that the sensing diaphragm 22 is tensioned radially so that it becomes hardened according to the tension. As a result, the diaphragm 22 responds differently to a given $P_1$–$P_2$ pressure differential than it would if it were under a different radial tension. This, of course, causes a change in electrical capacity between the sensing diaphragm and the metal foils 25, 26. For example, if in a first case the differential pressure $\Delta P$ is 1 kg/cm², the pressure $P_1$ is 49 kg/cm² and the pressure $P_2$ is 50 kg/cm² and in a second case the differential pressure $\Delta P$ is still 1 kg/cm², but the pressure $P_1$ is 99 kg/cm² and the pressure $P_2$ is 100 kg/cm², the greatly increased static pressure in the second case results in greater tension and hardening of diaphragm 22 with a resultant smaller deflection, despite the fact the ΔP is the same in both cases. Thus, the change in electrical capacity in the second case is smaller than that of the first case. For this reason, the pressure sensing device poses a problem such that the output signal span (i.e. change in electrical capacity) changes with the magnitude of static pressure acting on the first sensing chamber 20 and second sensing chamber 21.

Secondly, there is an occurrence of overpressure error. As previously mentioned, the overpressure may be prevented in the pressure sensing device by the provision of an arrangement such that the sensing diaphragm 22 impinges upon the metal foils 25 and 26 before the pressure receiving diaphragms 27 and 28 impinge upon the housing 17. However if the sensing diaphragm 22 is brought into close contact with the ceramic tubes 23 and 24 by the action of overpressures, a part of the sensing diaphragm 22 corresponding to the bores in the ceramic tubes 23 and 24 is forced into the bores. The greater the overpressures, the greater the part of the sensing diaphragm 22 which will be forced into the bores of the ceramic tubes 23 and 24. This causes a problem such that when the overpressures have been removed, the deflection of the diaphragm is not completely returned to its original state due to a residual stress. As a consequence, if the sensing operation should be continued in a condition where the diaphragm is deflected, it leads to an error in the output signal.

SUMMARY OF THE INVENTION

It is therefore an object of this invention to provide a device for use in sensing pressures of the type as described, which can eliminate the two disadvantages noted above, that is, the disadvantage of the span change due to static pressure and the disadvantage of overpressure error.

The object of the present invention may be accomplished by the provision of an arrangement comprising: a pressure transmission portion, said pressure transmission portion having an insulator, a sensing diaphragm to form a sensing chamber in cooperation with a surface of said insulator, and a deflection detecting element disposed on said insulator to electrically detect deflection of said sensing diaphragm, a casing having a cavity within which said pressure transmission portion is arranged, a supporting diaphragm to support said pressure transmission portion within the cavity of said casing, a pressure receiving diaphragm which forms a pressure receiving chamber spaced from the cavity of said casing and having a surface to receive pressures of fluid to be sensed, a fluid passage to communicate the cavity of said casing with said sensing chamber, a communicating bore to communicate the cavity of said casing with said pressure receiving chamber, and a filler liquid filled into the cavity of said casing and said sensing chamber to deflect said sensing diaphragm in response to deflection of said pressure receiving diaphragm caused by the pressure of said fluid to be sensed, whereby deflection of said sensing diaphragm may be used to sense pressure of said fluid to be sensed.

Particularly, according to the present invention, in the case where metal foils which form capacitor plates are used as a deflection detecting element, the pressure is detected as a change in electrostatic capacity, whereas in the case where induction coils are used, the pressure is detected as a change in impedance of the induction coil.

Further, according to a specifically preferred embodiment of the present invention, the invention may be applied to a pressure sensing device for sensing differential pressure or a single pressure. When differential pressure is sensed, there is provided an arrangement which comprises a differential pressure transmission portion, and portion having an insulator with an internal space, a sensing diaphragm to hermetically divide said internal space into a first sensing chamber and a second sensing chamber, and a deflection detecting element disposed on said insulator to electrically detect deflection of said sensing diaphragm, a casing having an internal space within which said differential pressure transmission portion is arranged, a supporting diaphragm to support said differential pressure transmission portion within the internal space of said casing and to hermetically divide said internal space into a first cavity and a second cavity along with said differential pressure transmission portion, a first pressure receiving diaphragm and a second pressure receiving diaphragm which form a first pressure receiving chamber and a second pressure receiving chamber spaced from the first cavity and the second cavity, respectively, of said casing, and having surfaces to receive pressures of two sources of fluid to be sensed, respectively, under different pressure, a first fluid passage and a second fluid passage to provide communications between said first cavity and said first sensing chamber and between said second cavity and said second sensing chamber, respectively, a first communicating bore and a second communicating bore to provide communications between said first pressure receiving chamber and said first cavity and between said second pressure receiving chamber and said second cavity, respectively, and a filler liquid filled into said first sensing chamber, second sensing chamber, first cavity, second cavity, first pressure receiving chamber and second pressure receiving chamber, whereby a difference in pressures acting on said first pressure receiving diaphragm and said second pressure receiving diaphragm may electrically be detected as a deflection of said sensing diaphragm.

BRIEF DESCRIPTION OF THE DRAWINGS

FIG. 1 is a sectional view of a conventional pressure sensing device;

FIG. 2 is a sectional view showing one embodiment according to the present invention;

DETAILED DESCRIPTION OF THE INVENTION

Figure 5:
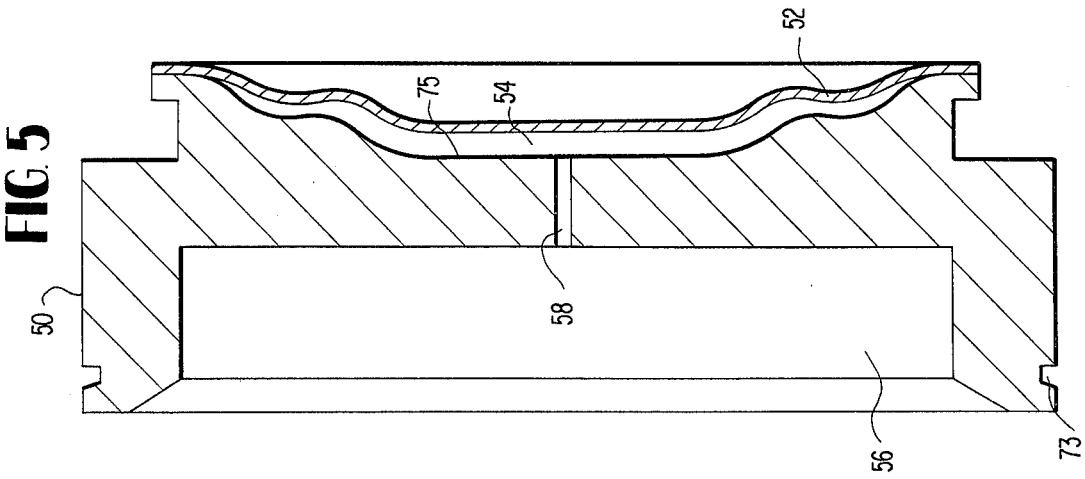
FIGS. 3 through 5 are sectional views on an enlarged scale showing main parts of the embodiment of FIG. 2.

FIG. 2, which shows an embodiment wherein differential pressure is sensed, comprises, a differential pressure sensing portion 40, a first cover body 41, and a second cover body 42. The first cover body 41 and second cover body 42 have a first pressure chamber 43 and second pressure chamber 44, respectively. A first source of fluid having pressure $P_1$ is introduced into the first pressure chamber 43 through a first pressure introducing bore 45, and a second source of fluid to be sensed having pressure $P_2$ is introduced into the second pressure chamber 44 through a second pressure introducing bore 46. The first source of fluid to be sensed and the second source of fluid to be sensed may be either liquid or gas. The first cover body 41 and the second cover body 42 are secured to the differential pressure sensing portion 40 by conventional means (not shown). The reference numerals 47 and 47' designate O-rings.

Figure 4:
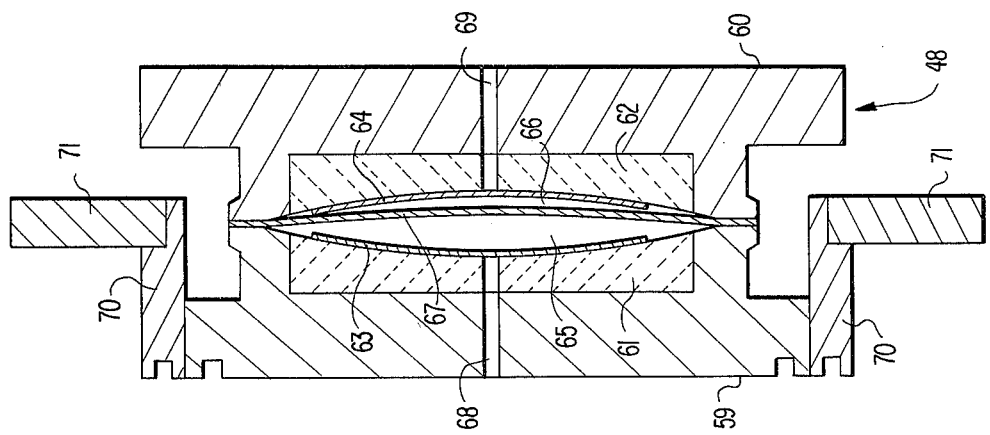
Figure 3:
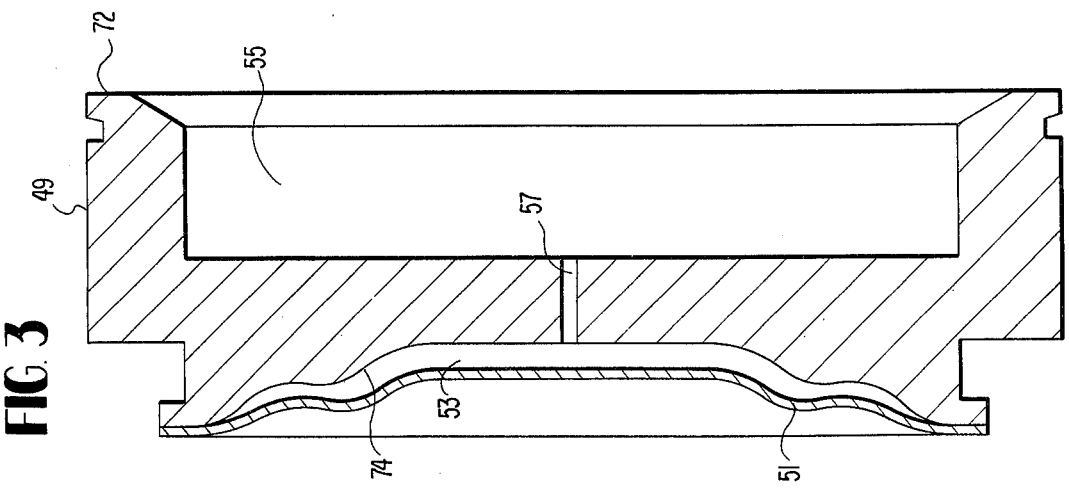

As may be seen most clearly in FIGS. 3 through 5, the differential pressure sensing portion 40 specifically comprises a differential pressure transmission portion 48 (FIG. 4), a first casing 49 (FIG. 3), and a second casing 50 (FIG. 5). The first casing 49 and second casing 50 are formed with a first cavity 55 and a second cavity 56, respectively, and a first pressure receiving diaphragm 51 and a second pressure receiving diaphragm 52 are provided on surfaces opposite the cavities. The first pressure receiving diaphragm 51 and the first casing 49 form a first pressure receiving chamber 53. The diaphragm 51 is subjected to the pressure $P_1$ introduced into the chamber 43. Also, the second pressure receiving diaphragm 52 and the second casing 50 form a second pressure receiving chamber 54. The second diaphragm 52 is subjected to the pressure $P_2$ introduced into the chamber 44. The first casing 49 and the second casing 50 are formed in a facing symmetrical relation and formed with a first communicating bore 57 and a second communicating bore 58, which provide communications between the first cavity and the first pressure receiving chamber and between the second cavity and the second pressure receiving chamber 54, respectively.

The differential pressure transmission portion 48 has a first housing 59 and a second housing 60, said first and second housings being formed with respective cavities, which are filled with insulating materials 61 and 62, respectively, such as glass or ceramics. One surface of each of insulating materials 61 and 62 is hemispherically or dish shaped, and has metal foil 63, 64 as a capacitor plate placed thereon. The first housing 59 and the second housing 60 are formed in a facing symmetrical relation, with the metal foils 63 and 64 opposite one another and having a sensing diaphragm 67, which is welded to the first housing 59 and second housing 60, positioned therebetween. The hemispherical surface of the insulator 61 and the sensing diaphragm 67 constitute a first sensing chamber 65, and the hemispherical surface of the insulator 62 and the sensing diaphragm 67 constitute a second sensing chamber 66. Further, the first housing 59 is formed with a first fluid passage 68 through which the first sensing chamber 65 communicates with the first cavity 55 in the first casing 49, whereas the second housing 60 is formed with a second fluid passage 69 through which the second sensing chamber 66 communicates with the second cavity 56 in the second casing 50. An annular ring 70 is welded to the first casing 59, and an annular support diaphragm 71 is welded to the annular ring 70.

The support diaphragm 71 is sandwiched between an end 72 of the first casing 49 and an end 73 of the second casing 50 such that the transmission portion 48 is arranged within the first cavity 55 in the first casing 49 and the second cavity 56 in the second casing 50. Thereafter, filler liquid such as silicone oil is filled, by means not shown, into the first pressure receiving chamber, first cavity, and first sensing chamber, and into the second pressure receiving chamber, second cavity and second sensing chamber.

The function of the above-described construction will now be described. When the differential pressure between pressures $P_1$ and $P_2$ introduced into the first pressure chamber 43 and second pressure chamber 44, respectively, is within the selected range of sensing, the sensing diaphragm 67 functions as a movable electrode while the metal foils 63 and 64 function as a fixed electrode in a manner similar to that of pressure sensing device shown in FIG. 1, and the electrostatic capacity therebetween changes in proportion to the differential pressure thereof and is electrically taken out by a means not shown. Next, when an overpressure is produced in the first pressure chamber 43, the support diaphragm 71 causes the differential pressure transmission portion 48 to move toward the second cavity 56 in the second casing 50 until the first pressure receiving diaphragm 51 comes into close contact with a diaphragm seating surface 74 of the first casing 49. This movement of the differential pressure transmission portion 48 corresponds to a quantity of volume of the first pressure receiving chamber 53. Also, when the overpressure is produced in the second pressure chamber 44, the support diaphragm 71 causes the differential pressure transmission portion 48 to move toward the first cavity 55 in the first casing 49 until the second pressure receiving diaphragm 52 comes into close contact with a diaphragm seating surface 75 of the second casing 50. Likewise, this movement of the differential pressure transmission portion 48 corresponds to a quantity of volume of the second pressure receiving chamber 54. In this way, according to the present invention, the protection of overpressure may be accomplished by the impingement of the first pressure receiving diaphragm 51 or the second pressure receiving diaphragm 52 upon the first casing 49 or the second casing 50.

In the present invention, the differential pressure transmission portion 48 is arranged within the cavities 55 and 56, and therefore no part of the outside of the housings 59 and 60 are subjected to atmospheric pressure. As can be seen, due to the unique arrangement the pressure is substantially the same on the inner and outer parts of the housings. For this reason, whatever the magnitude of the pressures $P_1$ and $P_2$, the first housing 59 and the second housing 60 will not be inflated from the interior thereof toward the outside. As a result, the sensing diaphragm 67 will not receive a tension in a radial direction thereof, and a span change due to the static pressure will not be produced.

Furthermore, according to the present invention, since the protection of overpressure is accomplished by the impingement of the first pressure receiving diaphragm 51 and the second pressure receiving diaphragm 52 upon the first casing 49 and the second casing 50, respectively, the sensing diaphragm 67 is not caused to be deflected to such extent that an error in sensing is induced due to the overpressure. It should be noted that the first pressure receiving diaphragm 51 and the second pressure diaphragm 52 are brought into close contact with the diaphragm seating surface 74 of the first casing 49 and the diaphragm seating surface 75 of the second casing 50 so that they may be deflected to a certain degree; however, the elastic hardness of the pressure receiving diaphragms 51 and 52 is designed to be soft, which is about 1/100 of the sensing diaphragm 67, and hence, such deflection will not bring forth an error in sensing.

Figure 6:
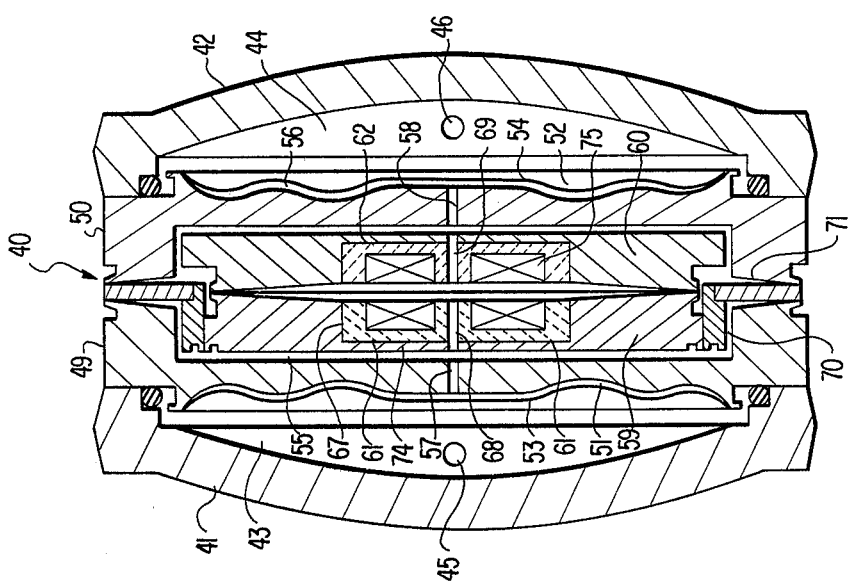
FIG. 6 is a sectional view showing another embodiment of the invention.

FIG. 6 is a sectional view showing another embodiment of the present invention, wherein those elements which are the same as their counterparts in FIG. 2 bear the same reference numerals. The first housing 59 and the second housing 60 are formed with respective cavities, which are similarly filled with the insulating materials 61 and 62. The facing side of each of insulating materials 61 and 62 are cut out partially so as to accommodate therein induction coils 74 and 75, respectively, to detect deflection of the sensing diaphragm 67. Each of the induction coils 74 and 75 forms a branch line of an AC current measuring bridge. Materials used for the sending diaphragm 67 are those metals having a high and low permeability. Where the diaphragm is made of a metal having a high permeability, the deflection of the sensing diaphragm 67 affects the effective resistance of a magnetic circuit of the induction coils 74 and 75. Where the diaphragm is made of a metal having a low permeability, it operates as a short-circuit coil, whereby an eddy current generated by the sensing diaphragm 67 acts on the reduction coils 74 and 75 in a braking fashion, which will cause changes in impedance of the induction coils 74 and 75.

Figure 7:
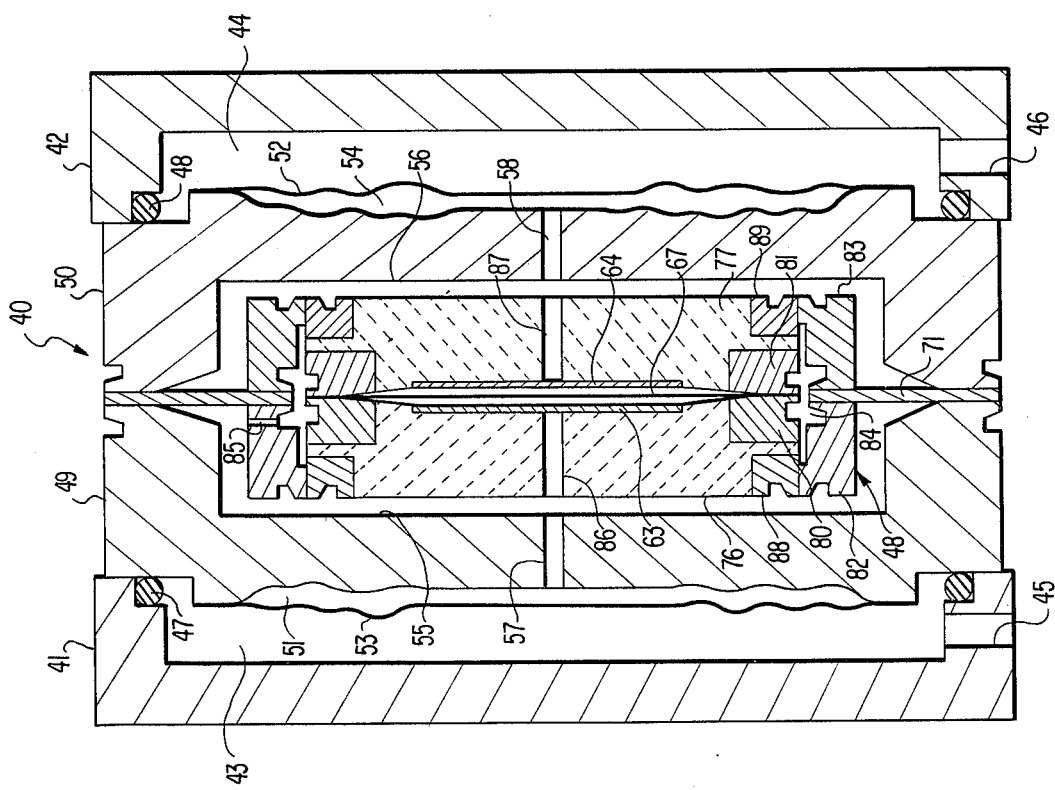
FIG. 7 is a further embodiment of the present invention.

FIG. 7 is a sectional view showing a further embodiment of the present invention, wherein those elements which are the same as their counterparts in FIG. 2 bear the same reference numerals. In this embodiment, the first housing and the second housing are not shaped as is shown in FIGS. 2 and 6, but are annularly shaped. The annualarly-shaped first housing 88 and second housing 89 are provided with insulators 76 and 77, respectively, which are similarly formed with the metal foils 63 and 64, respectively. The first housing 88 and the second housing 89 are welded to annular rings 82 and 83, respectively, which are in turn deposited to the support diaphragm 71. With this arrangement, an annular gap 84 is formed between the differential pressure transmission portion 48 and the annular rings 82, 83, the annular ring 82 being formed with a communicating bore 85 so as to communicate the annular gap 84 with the first cavity 55 in the first casing 49. It should be noted that the insulators 76 and 77 are formed with a first fluid passage 86 through which the first cavity 55 is communicated with the first sensing chamber and a second fluid passage 87 through which the second cavity 56 is communicated with the second sensing chamber.

The insulators 76 and 77 are further provided with annular metal bodies 80 and 81, respectively, between which is placed and welded thereto the sensing diaphragm 67. It should further be noted that the annular metal body 80 may be formed integral with the first housing 88, and the same is true for the annular metal body 81 and the second housing 87.

Figure 8:
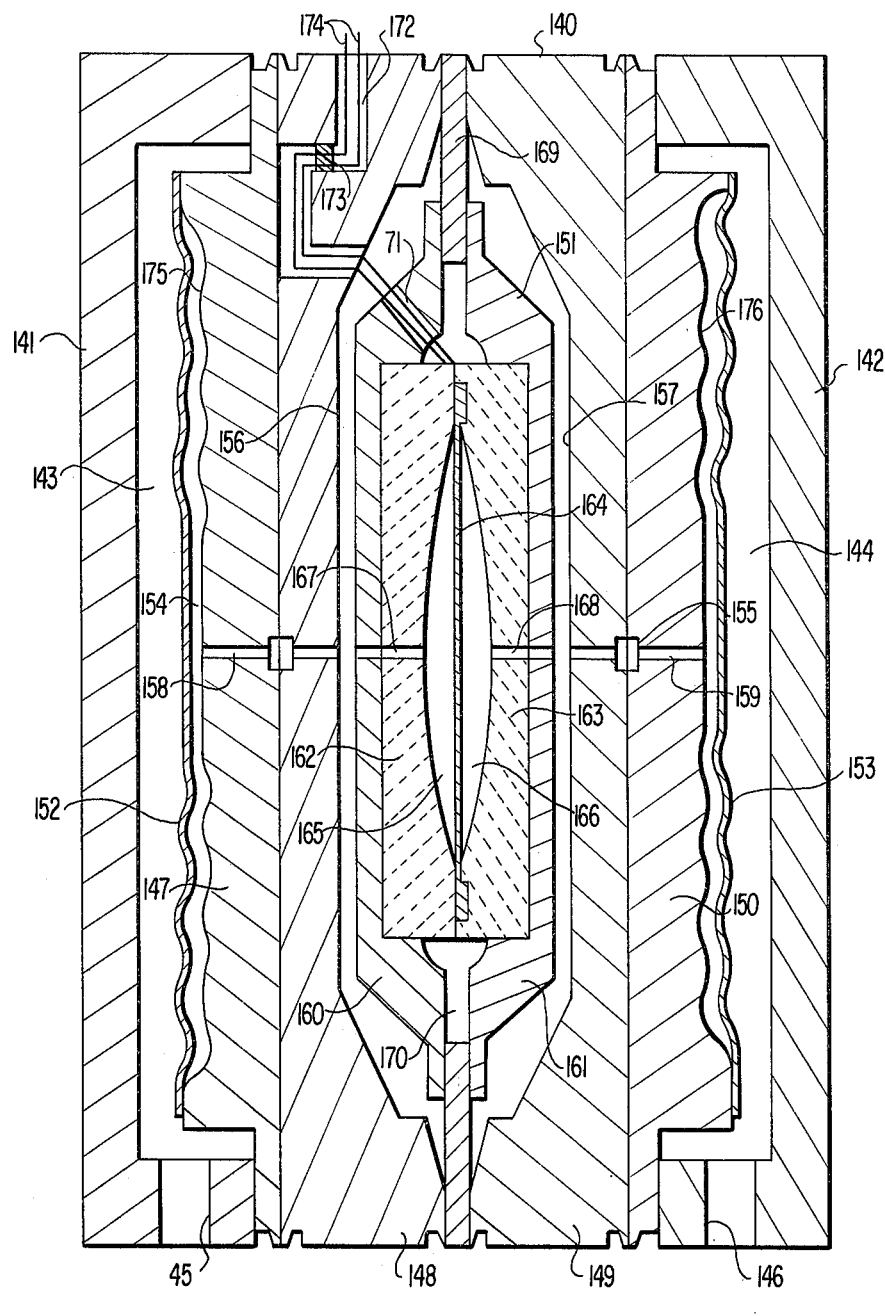
FIG. 8 is a further embodiment of the invention, utilizing a diffussion type diaphragm.

FIG. 8 shows a further embodiment wherein the pressure sensing diaphragm is a diffusion type diaphragm of the type which is produced by diffusing piezoelectric resistance elements on a single crystal silicon slice. Such a diaphragm can be produced by forming a group of strain gauge resistor elements on two crystallographic axes (110) crossing perpendicularly to each other on a crystal face (100) of a single crystal silicon slice.

The embodiment shown basically comprises a differential pressure sensing block 140, a first cover 141 and a second cover 142. The first cover 141 and the second cover 142 respectively have a first pressure chamber 143 and a second pressure chamber 144 in which a first fluid at a pressure of $P_1$ to be measured is introduced into the first pressure chamber 143 through a first pressure introduction inlet 145 and a second fluid at a pressure of $P_2$ to be measured is introduced into the second pressure chamber 144 through a second pressure introduction inlet 146. The first fluid and the second fluid to be measured may be liquid or gas. The first cover 141 and the second cover 142 are secured to the differential pressure sensing block 140 by adequate means not shown.

The differential pressure sensing block 140 mainly comprises a first casing 147, second casing 148, third casing 149, fourth casing 150 and a differential pressure transmission block 151, in which the first casing 147 and the second casing 148, and the third casing 149 and the fourth casing 150 are welded together with each other. Thus the four casings may be considered as being only a first and second casing. A first pressure-receptive diaphragm 152 is welded to the first casing 147 and a second pressure-receptive diaphragm 153 is welded to the fourth casing 150. The first pressure-receptive diaphragm 152 defines a first pressure-receptive chamber 154 in cooperation with the first casing 147. The second pressure-receptive diaphragm 153 defines a second pressure-receptive chamber 155 in cooperation with the fourth casing 50. The second casing 148 is formed with a first recess 156 and the third casing 149 is formed with a second recess 157. The first casing and the second casing 148 are formed with a first communication channel 158 for connecting the first pressure-receptive chamber 154 with the first recess 156, and the third casing 149 and the fourth casing 150 are formed with a second communication channel 159 for connecting the second pressure-receptive chamber 135 with the second recess 157.

The differential pressure transmission portion 151 has a first housing 160 and a second housing 161 on which insulating members 162 and 163 of glass or ceramic material or the like are supported respectively. Each facing surface of the insulating members 162 and 163 is dish-shaped or concave, and the insulating members are joined together in a closed manner in such a way that the two concave surfaces oppose each other, with the diffusion type diaphragm 164 between them. Thus, a first measuring chamber 165 is defined by the concave surface of insulating member 162 and the diffusion type diaphragm 164, and a second measuring chamber 166 is defined by the concave surface insulating member 163 and the diffusion type diaphragm 164. A first fluid channel 167 for connecting the first measuring chamber 165 with the first recess 156 of the second casing 148 is formed through the first housing 160 and the insulating member 162 and a second fluid channel 168 for connecting the second measuring chamber 166 with the second recess 157 in the third casing 149 is formed through the second housing 161 and the insulating member 163. In the differential pressure transmission block 151, the first housing 160 and the second housing 161 are respectively welded to an annular support diaphragm 169 while defining an annular clearance 170 between the two housings 160 and 161 when the insulating members 162 and 163 are supported on the respective sides thereof by the first housing 160 and the second housing 161. For connecting the annular clearance 170 with the first recess 156 in the second casing 148, an aperture 171 if formed in the first housing 160, and a lead wire 174 for the diffusion type diaphragm 164 is led to the outside through the aperture 171.

The differential pressure transmission block 151 is sandwitched at its supporting diaphragm 169 between the peripheral end of the second casing 148 and the peripheral end of the third casing 149 and disposed within the first recess 156 of the second casing 148 and the second recess 157 of the third casing 159. Then, sealed fluid such as silicone oil and the like is filled within the first pressure-receptive chamber 154, first recess 156, and the first measuring chamber 165 as well as the second pressure-receptive chamber 155, second recess 157, and the second measuring chamber 166 by adequate means not shown.

A channel 172 is formed in the second casing 148 and a lead wire 174 is led to the outside of the apparatus for measuring differential pressure through the channel 172. Reference numeral 173 denotes a hermetic seal.

The operation of the apparatus having the foregoing structure will now be described. When the differential pressure ΔP between the pressures $P_1$ and $P_2$ introduced into the first pressure chamber 143 and the second pressure chamber 144 respectively is within a predetermined measuring range, the differential pressure is electrically determined as a change in the resistance of the diffusion type diaphragm 164 just as is known in the prior art.

If an excess pressure results, for example, at the first pressure chamber 143, the supporting diaphragm 169 causes the entire portion of the differential pressure transmission portion 151 to move toward the second recess 157 in the third casing 149 till the first pressure-receptive diaphragm 152 closely contacts the diaphragm seat surface 175 on the first casing 147. The movement corresponds substantially to the inner volume of the first pressure-receptive chamber 154. If the excess pressure is at the second pressure chamber 155, the supporting diaphragm 169 causes the differential pressure transmission portion 151 to move toward the first recess 156 in the second casing 148 till the second pressure-receptive diaphragm 153 closely contacts the diaphragm seat surface 176 on the fourth casing 150. The movement also corresponds substantially to the inner volume of the second pressure-receptive chamber.

From the foregoing description, the present invention provides an arrangement wherein the differential pressure transmission portion is arranged within the first and second cavities in the first and second casings to provide the same pressure between the interior and the exterior of the first and second housings, and therefore, the first housing and second housing will not be inflated due to static pressure, as a consequence of which the sensing diaphragm will not receive a tension in a radial direction thereof. For this reason, no span change is produced due to static pressure. Moreover, according to the present invention, since the protection of overpressure is accomplished by the impingement of the first pressure receiving diaphragm and the second pressure receiving diaphragm upon the first casing and the second casing, the sensing diaphragm is not caused to be deflected to such extent that an error in sensing is induced due to the overpressure.

What is claimed is:

1. A device for use in sensing differential pressure comprising,
   a. a casing defining an internal casing space therein,
   b. a differential pressure detecting portion having a sensing diaphragm mounted within an internal space thereof hermetically dividing said detecting portion internal space into first and second sensing chambers,
   c. means for preventing distortion of said sensing diaphragm in response to an overpressure condition, said means comprising a flexible supporting diaphragm supporting said differential pressure detecting portion within said casing internal space and hermetically dividing said casing internal space into first and second cavities,
   d. first and second pressure receiving diaphragms positioned with respect to said casing to define first and second pressure receiving chambers, respectively,
   e. first and second fluid passages for providing communications between said first cavity and said first sensing chamber and between said second cavity and said second sensing chamber, respectively,
   f. first and second communicating bores for providing communications between said first pressure receiving chamber and said first cavity and between said second pressure receiving chamber and said second cavity, respectively, and
   g. a filler liquid filled into said first and second sensing chambers, said first and second cavities, and said first and second pressure receiving chambers, whereby a difference in pressures acting on said first and second pressure receiving diaphragms may electrically be detected as a deflection of said sensing diaphragm.

2. A device for use in sensing differential pressure as claimed in claim 1, wherein said differential pressure detecting portion comprises insulating means bounding said detecting portion internal space, and a deflection detecting element disposed on said insulating means for electrically detecting deflection of said sensing diaphragm.

3. A device for use in sensing differential pressure as claimed in claim 2, wherein said deflection detecting element comprises two metal foils disposed on two surfaces of said insulating means on opposite sides of said sensing diaphragm, respectively, said two metal foils constituting a capacitor.

4. A device for use in sensing differential pressure as claimed in claim 1, wherein one of said pressure receiving diaphragms is adapted for receiving a standard pressure, and the other said pressure receiving diaphragm is adapted for receiving a pressure to be measured.

5. A device for use in sensing differential pressure as claimed in claim 1, wherein one of said pressure receiving diaphragms is adapted for receiving a first pressure to be measured and the other pressure receiving diaphragm is adapted for receiving a second pressure to be measured.

6. A device as claimed in claim 1 wherein said differential pressure detecting portion comprises,
   a. a first housing member and a first insulation means fixidly held by said first housing member, said first insulation means forming with one side of said sensing diaphragm, the said first sensing chamber,
   b. a second housing member and a second insulation means fixidly held by said second housing member, said second insulation means forming with the other side of said sensing diaphragm, the said second sensing chamber.

7. A device as claimed in claim 6 wherein said casing comprises
   a. a first casing member and a second casing member positioned facing one another and having respective cavities therein defining said casing internal space, b. the outer side of said first casing having a pressure receiving diaphram mating surface across which said first pressure receiving diaphragm is attached for defining said first pressure receiving chamber, and c. the outer side of said second casing having a pressure receiving diaphragm mating surface across which said second pressure receiving diaphragm is attached for defining said second pressure receiving chamber.

8. A device as claimed in claim 7 wherein said sensing, support and receiving diaphragms, said spacings and said filled liquid are constituted so that an overpressure on either of said receiving diaphragms moves said detecting portion toward said opposite casing and said overpressure receiving diaphragm towards the mating surface of its corresponding casing, the latter closing before the former.

9. A device for use in sensing differential pressure as claimed in claim 2, wherein said deflection detecting element is composed of induction coils acting as an impedance change detecting means.

10. A device for use in sensing differential pressure as claimed in claim 1, wherein said differential pressure detecting portion comprises insulating means bounding said detecting portion internal space, and wherein said sensing diaphragm comprises a deflection detecting element.

11. A device for use in sensing differential pressure as claimed in claim 10, wherein said sensing diaphragm is composed of a single crystal silicon slice plate and a piezoelectric resistance elements on said silicon slice plate prepared by an impurity diffusion process.

* * * * *